(12) United States Patent
Fröjdh

(10) Patent No.: US 6,684,687 B1
(45) Date of Patent: Feb. 3, 2004

(54) CRANKSHAFT POSITION SENSING IN A COMBUSTION ENGINE

(75) Inventor: Håkan Fröjdh, Uppsala (SE)

(73) Assignee: Scania CV AB (publ) (SE)

( * ) Notice: Subject to any disclaimer, the term of this patent is extended or adjusted under 35 U.S.C. 154(b) by 0 days.

(21) Appl. No.: 09/831,839

(22) PCT Filed: Nov. 18, 1999

(86) PCT No.: PCT/SE99/02120

§ 371 (c)(1),
(2), (4) Date: May 15, 2001

(87) PCT Pub. No.: WO00/31397

PCT Pub. Date: Jun. 2, 2000

(30) Foreign Application Priority Data

Nov. 19, 1998 (SE) .............................. 9803949

(51) Int. Cl.$^7$ .............................. G01M 15/00
(52) U.S. Cl. .............................. 73/117.3
(58) Field of Search .............................. 73/116, 117.2, 73/117.3

(56) References Cited

U.S. PATENT DOCUMENTS

| | | | |
|---|---|---|---|
| 3,944,923 A | | 3/1976 | Luteran |
| 4,086,894 A | * | 5/1978 | Capurka et al. ............ 123/613 |
| 4,887,215 A | * | 12/1989 | Kumagai et al. ............ 701/102 |
| 5,079,945 A | * | 1/1992 | Hansen et al. ................. 73/116 |
| 5,447,143 A | * | 9/1995 | Ott et al. ..................... 123/612 |
| 6,034,525 A | * | 3/2000 | Koerner et al. ............. 324/165 |
| 6,035,826 A | * | 3/2000 | Matsuoka ............... 123/406.62 |
| 6,070,567 A | * | 6/2000 | Kakizaki et al. ........ 123/406.25 |
| 6,320,374 B1 | * | 11/2001 | Schroeder et al. ..... 324/207.25 |
| 6,499,342 B1 | * | 12/2002 | Gonzales, Jr. ............. 73/117.3 |

FOREIGN PATENT DOCUMENTS

| | | |
|---|---|---|
| DE | 4230616 | 3/1994 |
| DE | 44 18 579 A1 | 11/1995 |
| DE | 195 27 503 A1 | 1/1997 |
| EP | 0023801 | 2/1981 |
| EP | 0486088 | 5/1992 |
| JP | 59206769 | 4/1985 |

* cited by examiner

*Primary Examiner*—Eric S. McCall
(74) *Attorney, Agent, or Firm*—Ostrolenk, Faber, Gerb & Soffen, LLP

(57) ABSTRACT

An arrangement for a combustion engine with a control system for determining the engine's crankshaft position and direction, including two independent sensors (S1, S2), each of which cooperates with a group of rotational position markings (r). The two sensors (S1, S2) are crankshaft sensors and they are mutually displaced (a/A) in the rotation direction relative to the midpoints of the respective rotational position markings so that during crankshaft rotation the direction of rotation can be determined by comparison of the sensor signal sequences from the two sensors.

10 Claims, 1 Drawing Sheet

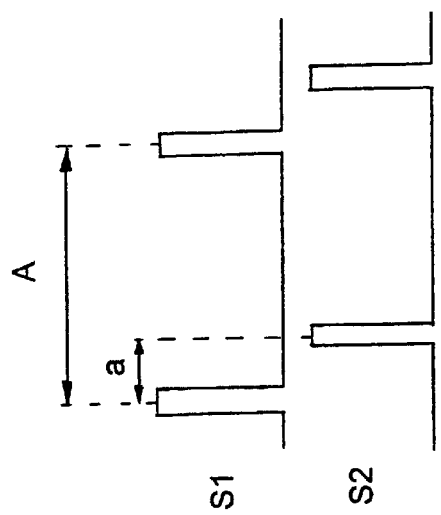
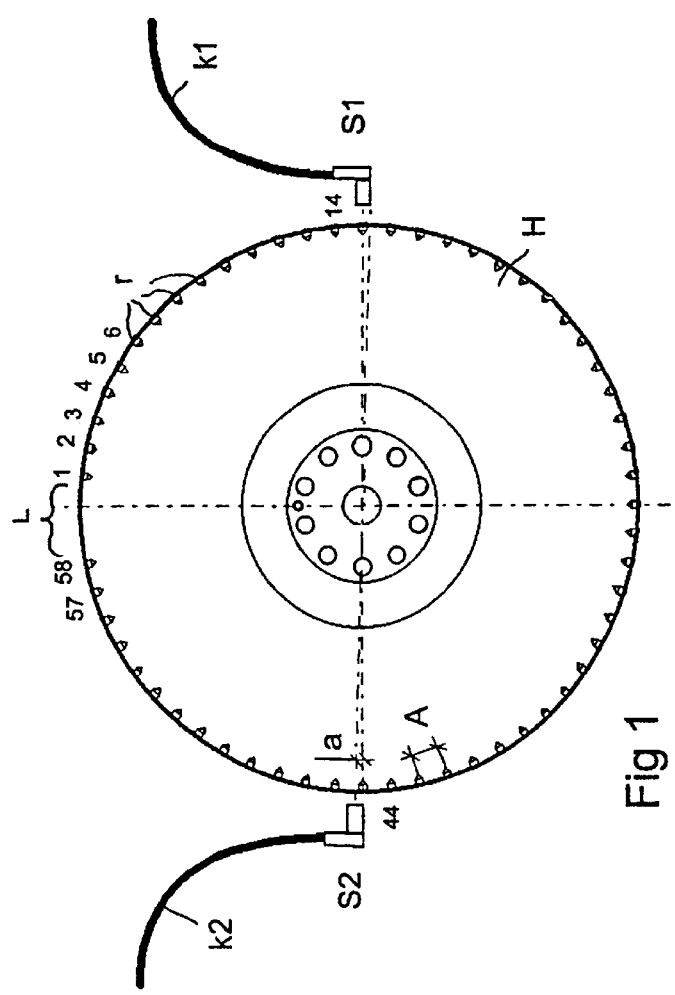
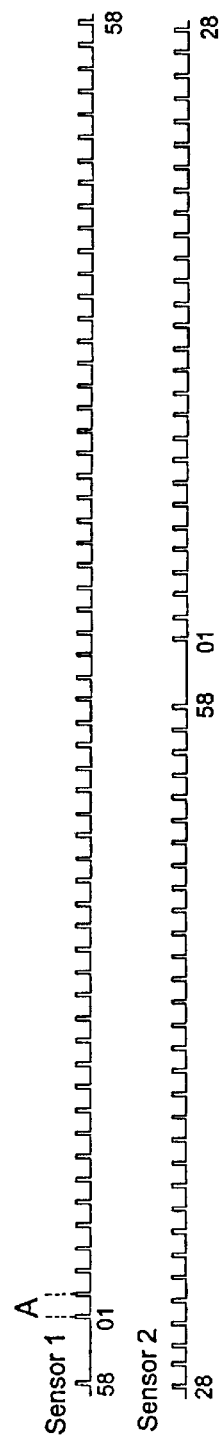
Fig 1
Fig 2
Fig 3

CRANKSHAFT POSITION SENSING IN A COMBUSTION ENGINE

FIELD OF INVENTION

The present invention related to an arrangement for combustion engines for sensing the position of the engine crankshaft.

STATE OF THE ART

During the starting of a four-stroke engine it is important that ignition at the correct phase position for each cylinder takes place as soon as possible. Otto engines have conventionally incorporated a mechanical coupling between the engine's crankshaft and an ignition distributor which is driven by a camshaft, and it has analogously been conventional to provide diesel engines with a fuel injection pump mechanically connected to the engine's crankshaft. Engine manufacture has thus involved establishing a direct mechanical connection between the engine's crankshaft and the ignition initiating device. Certain more recent engines, both Otto engines and diesel engines, have no such direct mechanical connection for determining the ignition but use instead other means for determining which phase position the engine is in and when ignition is to be initiated in each cylinder.

Various methods have been indicated for minimising the starting time, including the "trial and error" principle whereby a certain phase position is assumed for each cylinder, but in systems of that kind it takes a certain number of crankshaft revolutions to make sure that the assumption was correct.

Another arrangement of the kind mentioned in the introduction is known from DE-A1-42 30 616. That known arrangement uses a first sensor to read the reference marks on a sensor disc associated with the engine's flywheel, while a second sensor is used to read a reference mark on a sensor disc associated with the engine's camshaft. Switching the engine off results in the last angular position measured being stored in a non-volatile memory. The reason for that arrangement is a desire to be able immediately upon starting to relate the injection into each cylinder to the correct cylinder sequence and correct phase position.

However, that known arrangement also entails certain problems, one of which is that a camshaft sensor involves great reading uncertainty because the relatively small sensor disc generates a small number of pulses per revolution, only one pulse per camshaft revolution in the case of the known arrangement. Moreover, that system, if the non-volatile memory fails or there is engine movement after the engine has been switched off, results in a relatively long starting procedure because in such situations relatively long engine rotation, i.e. in principle according to the first technique mentioned, is required for determining the correct crankshaft position, leading to delayed engine starting. Furthermore, the principle of using a crankshaft sensor and a camshaft sensor entails reliability problems as regards the operation of the engine, since in principle only one sensor, the crankshaft sensor, does in practice control the injection into the engine's cylinders. Mechanical or electrical failure of this sensor causes problems for operating the diesel engine.

OBJECT AND CHARACTERISTICS OF THE INVENTION

One object of the present invention is to eliminate the problems of the state of the art and indicate a solution which results in better reliability of both starting and continuous operation of the engine and enables starting of the engine to be achieved more quickly.

This object is achieved in an arrangement of the aforesaid kind by means of two independent crankshaft sensors which sense the markings on the shaft and particularly on a flywheel on the shaft, wherein the sensors are mutually displaced around the shaft relative to the midpoints of the respective rotational position markings. During crankshaft rotation, the rotation direction can be determined by comparing the sensor signal sequences from the two sensors.

Further, there is a gap in the markings around the shaft with no markings which, when sensed, enables detection of the rotation position of the shaft.

Both of the sensors being crankshaft sensors results in doubled operating reliability and enhances the possibility of quickly determining the engine's position, particularly in the event of an abrupt stop and continuing crankshaft rotation thereafter or rotation of the crankshaft in different directions. The displacement indicated thus makes it easy for the control system to establish very quickly the direction in which the engine is rotating.

As a further feature of the invention, the markings are uniformly spaced around the shaft. They may be recesses in a flywheel on the shaft.

The rotational positions of the sensors are mutually displaced other than at 0, or one half the length of a gap between two markings, or an even multiple of the gap length, and particularly the displacement is 20–30% and preferably about 25% of the distance between adjacent rotational position markings.

A non-volatile memory stores the rotational position of the crankshaft when the engine is switched off, and the memory is to be used when the engine is restarted.

According to one advantageous embodiment, the two sensors (S1,S2) both cooperate with the same group of rotational position markings (r). This results in simplified and less expensive assembly of an arrangement according to the invention.

If each group of rotational position markings (r) exhibits a rotational position marking gap (L), the result is an appropriate possibility of detecting the rotational position of the crankshaft.

Arranging the two sensors at, in the direction of rotation, an angular displacement which is greater than the synchronisation gap also creates the possibility of measuring the flywheel position with great accuracy throughout each revolution. Using one sensor when the synchronising gap passes the other sensor and is therefore "blind" eliminates the disadvantages arising from the system being "blind" during the time when the gap passes the sensor, and vice versa for the other sensor.

It is advantageous for the control system to include a non-volatile memory arranged to store the rotational position of the crankshaft when the engine is switched off, with a view to using the same position when the engine is restarted. In normal circumstances this means that the engine starting time can be reduced to a minimum.

It is also advantageous for the memory to be arranged to be continuously updated during engine operation, in order to ensure that the correct cylinder position is constantly updated.

In cases where the rotational position markings (r) consist of recesses in the engine's flywheel (H), a conventional simple arrangement of rotational position markings may be used in conjunction with the invention.

The feature whereby the mutual rotational position displacement of the sensors differs from 0 and from A/2 and from even multiples of A, where A is the distance between two rotational position markings, results in an advantageous and practically feasible arrangement of the mutual positions of the sensors relative to one another.

It is at the same time advantageous that the mutual rotational position displacement of the sensors be between about 20 and 30%, advantageously about 25%, of the distance between two rotational position markings in order to create the optimum possibility of excellent signal resolution.

BRIEF DESCRIPTION OF THE DRAWINGS

Further advantages are indicated below by the following detailed description of an embodiment with reference to the drawings, in which:

FIG. 1 depicts schematically a flywheel with reference markings and two sensors, FIG. 2 depicts schematically the complete output signals from the sensors in FIG. 1, and FIG. 3 shows in more detail on a larger scale a section of the sensor signal sequences.

DESCRIPTION OF AN EMBODIMENT

The embodiment described here relates to a four-stroke four-cylinder directly injected diesel engine for vehicle use, in which the invention is used for determining when fuel injection into a cylinder is to take place and also determining thereby when ignition is to take place in the cylinder. When the crankshaft position has been determined for that cylinder, the positions for the other cylinders can thereafter be determined in a conventional manner.

In FIG. 1, notation H denotes in a usual manner a flywheel which is connected to the engine's crankshaft and which is provided around the periphery with a number of 58 references in the form of rotational position markings r 1–58. L denotes a marking gap in which there are no rotational position markings for a distance corresponding to two such rotational position markings. In practice, the rotational position markings r consist of holes drilled in the flywheel H. S1 and S2 indicate two crankshaft sensors which in this embodiment are positioned substantially diametrically opposite one another but with a certain displacement a which constitutes a small part of the distance A between two mutually adjacent rotational position markings r. The crankshaft sensors S1 and S2 may be inductive sensors, Hall effect sensors or sensors of any other suitable kind, and the output signals from the sensors are led via signal cables K1 and Y2 respectively to the engine's control system.

FIG. 2 illustrates the output signal sequences from the two sensors, with the upper signal curve representing signals from the one sensor S1 and the lower signal curve signals from the other sensor S2. It may be observed that the distance between two signal spikes is 360°/60, i.e. 6° in the direction of rotation.

FIG. 3 illustrates in detail on a larger scale the signal spikes from the crankshaft sensors S1 and S2, where A is the distance between two mutually adjacent reference spikes, while a is the (shortest) distance between two signal spikes, immediately following one another, from the respective crankshaft sensors. The distances A and a start in this example from the midpoints of the respective signals/rotational position markings.

FIG. 3 shows that in order to be able to detect the direction of rotation it is necessary for the distance a to be detectably different from 0 and detectably different from A/2. The distance a must of course also differ from even multiples of A. Optimum resolution is achieved if a is 25% of A, but in practice it is advantageous for a to be between about 20 and 30% of A. Detection of the direction of rotation from left to right in FIG. 3 (anticlockwise in FIG. 1) detects initially a first pulse from S1, followed shortly thereafter (corresponding to a) by a first pulse from S2 and, a longer time thereafter (corresponding to A), the second pulse from S1. From this information the control system can infer the direction of rotation at the time. If a reverse direction of rotation is detected, the pulse sequence will then be as seen in FIG. 3 from right to left.

The invention is advantageously used in conjunction with a non-volatile memory M which is arranged to be updated continuously during engine operation and which receives a signal from the sensors. The memory is arranged to store the last engine position detected when the engine is switched off. This means that the time to starting, i.e. the correct immediate injection into the correct cylinder, can be shortened to a minimum.

The invention may be modified within the scopes of the patent claims, e.g. the rotational position markings may be provided in a different manner and the crankshaft sensors be positioned otherwise than substantially diametrically opposite one another. In any case, the sensors have therefore to be so positioned that in principle two pulses received from one sensor and one pulse from the other sensor will be sufficient for determining the direction of rotation of the engine.

It may in general be said that the engine's injection system is entirely dependent on the control system having accurate knowledge of the position of the crankshaft. Using two crankshaft sensors also substantially improves operating reliability during continuous operation of the engine, since failure of one crankshaft sensor in such circumstances is advantageously compensated for by the remaining sensor. The actual resolution is also improved because the holes in the flywheel are read in two different positions, resulting in the number of position measurements being twice that provided by only one sensor.

What is claimed is:

1. An arrangement for a control system for a combustion engine for determining a position and rotation direction of an engine crankshaft, the arrangement comprising:

an engine crankshaft which is rotatable;

a group of rotational position markings arrayed around the crankshaft;

first and second independent crankshaft sensors for sensing the rotation of the rotational position markings past each of the sensors, the sensors being located substantially opposite each other around the crankshaft but displaced such that when the first sensor is directly opposite a midpoint or a first rotational position marking, the second sensor is located a predetermined distance from a midpoint of a second rotational position marking that is 180 degrees from the first rotational position marking, the direction of rotation of the crankshaft being determined by comparing respective sensor signals from the first and second sensors; and a gap in the rotational position markings around the crankshaft, so that the gap is sensed by the first or the second sensor and enables a detection of the rotational position of the crankshaft.

2. The arrangement of claim 1, wherein the rotational position markings in the group are uniformly spaced apart on the crankshaft and the gap comprises no marking at the uniform gap spacing between two of the marks at opposite sides of the gap.

3. The arrangement of claim 1, wherein the control system includes a non-volatile memory operable to store the rotational position of the crankshaft when the engine is off and operable for use when the engine is restarted.

4. The arrangement of claim 3, wherein the memory is so connected with the sensors as to be continuously updated during rotation of the crankshaft.

5. An arrangement for a control system for a combustion engine for determining a position and rotation direction of an engine crankshaft, the arrangement comprising:

an engine crankshaft which is rotatable;

a group of rotational position markings arrayed around the crankshaft;

first and second independent crankshaft sensors for sensing the rotation of the rotational position markings past each of the sensors, the sensors being located substantially opposite each other around the crankshaft but displaced such that when the first sensor is directly opposite a midpoint or a first rotational position marking, the second sensor is located a predetermined distance from a midpoint of a second rotational position marking that is 180 degrees from the first rotational position marking, the direction of rotation of the crankshaft being determined by comparing respective sensor signals from the first and second sensors; and a gap in the rotational position markings around the crankshaft, so that the gap is sensed by the first or the second sensor and enables a detection of the rotational position of the crankshaft, wherein an engine flywheel is disposed on and rotates with the crankshaft and the rotational position markings comprise recesses spaced apart in the engine flywheel.

6. The arrangement of claim 5, wherein the rotational position marking recesses in the group are uniformly spaced apart on the flywheel.

7. An arrangement for a control system for a combustion engine for determining a position and rotation direction of an engine crankshaft, the arrangement comprising:

an engine crankshaft which is rotatable;

a group of rotational position markings arrayed around the crankshaft;

first and second independent crankshaft sensors for sensing the rotation of the rotational position markings past each of the sensors, the sensors being located substantially opposite each other around the crankshaft but displaced such that when the first sensor is directly opposite a midpoint or a first rotational position marking, the second sensor is located a predetermined distance from a midpoint of a second rotational position marking that is 180 degrees from the first rotational position marking, the direction of rotation of the crankshaft being determined by comparing respective sensor signals from the first and second sensors; and a gap in the rotational position markings around the crankshaft, so that the gap is sensed by the first or the second sensor and enables a detection of the rotational position of the crankshaft, wherein the predetermined distance differs from zero, from one-half of a spacing between adjacent rotational position markings, and from even multiples of the spacing between adjacent rotational position markings.

8. The arrangement of claim 7, wherein the rotational position markings in the group are uniformly spaced apart on the crankshaft.

9. The arrangement of claim 8, wherein the predetermined distance is between about 20% and 30% of the rotational distance between two adjacent rotational position markings in the group.

10. The arrangement of claim 8, wherein the predetermined distance is about 25% of the rotational distance between two adjacent rotational position markings in the group.

* * * * *